United States Patent [19]
Faigle et al.

[11] Patent Number: 5,720,495
[45] Date of Patent: Feb. 24, 1998

[54] AIR BAG INFLATOR WITH CLAMPING RING FOR RUPTURABLE DISK

[75] Inventors: Ernst M. Faigle, Dryden; Tracy S. Sparks, Lapeer; Richard J. Thompson, Imlay City, all of Mich.

[73] Assignee: TRW Vehicle Safety Systems Inc., Lyndhurst, Ohio

[21] Appl. No.: 586,993

[22] Filed: Jan. 16, 1996

[51] Int. Cl.⁶ .................................................. B60R 21/26
[52] U.S. Cl. .................. 280/737; 137/68.13; 137/68.19; 222/3
[58] Field of Search .......................... 280/737, 741, 280/736, 740, 742; 137/68.13, 68.19, 68.23, 68.27, 68.28; 222/3; 220/203.08, 261

[56] References Cited

U.S. PATENT DOCUMENTS

| | | | |
|---|---|---|---|
| 2,453,891 | 11/1948 | Burt | 137/68.23 |
| 2,684,180 | 7/1954 | Allen | 137/68.23 |
| 2,972,998 | 2/1961 | Detwiler | 137/68.13 |
| 3,163,014 | 12/1964 | Wismar | 222/3 |
| 3,648,898 | 3/1972 | Day | 280/737 |
| 3,690,695 | 9/1972 | Jones, Sr. | 280/741 |
| 3,834,729 | 9/1974 | Oka et al. | 280/737 |
| 3,854,491 | 12/1974 | Bryan et al. | 280/737 |
| 3,966,226 | 6/1976 | Roth | 280/737 |
| 3,966,228 | 6/1976 | Neuman | 280/737 |
| 4,203,616 | 5/1980 | Okada | 280/737 |
| 5,199,740 | 4/1993 | Frantom et al. | 280/741 |
| 5,263,740 | 11/1993 | Frey et al. | 280/737 |

*Primary Examiner*—Peter C. English
*Attorney, Agent, or Firm*—Tarolli, Sundheim, Covell, Tummino & Szabo

[57] ABSTRACT

An apparatus (14) for inflating an inflatable vehicle occupant device (12) includes a container (20) defining a chamber (22) containing a source of inflation fluid. The container (20) includes an opening (26) through which the inflation fluid flows outward from the chamber (22). A rupturable disk (36) closes the opening (26) in the chamber (22) and engages a shoulder (30) on the container (20). An annular eloping ring (44) engages the rupturable disk (36). A manifold (54) clamps the clamping ring (44) and the rupturable disk (36) to the shoulder (30) of the container (20).

25 Claims, 4 Drawing Sheets

AIR BAG INFLATOR WITH CLAMPING RING FOR RUPTURABLE DISK

BACKGROUND OF THE INVENTION

The present invention relates to an inflator for inflating an inflatable device, such as an air bag, of a vehicle occupant protection system. More specifically, the present invention relates to an inflator including a container defining a chamber in which a source of inflation fluid is contained and a rupturable disk that ruptures to provide an opening through which the inflation fluid flows outward from the chamber.

A known inflator for inflating an air bag includes a container defining a chamber containing a source of inflation fluid. A rupturable disk is welded to the outside of a neck portion of the container to cover an opening in the neck portion. The rupturable disk ruptures to provide an opening through which the inflation fluid flows.

SUMMARY OF THE INVENTION

The present invention is a new and improved inflator for inflating an inflatable device, such as an air bag, of a vehicle occupant protection system. The inflator includes container means for defining a chamber containing a source of inflation fluid. The container means includes surface means for defining an opening through which the inflation fluid flows outward from the chamber and for defining a shoulder in the container means. A rupturable disk for closing the opening in the chamber engages the shoulder in the container means. An annular clamping ring engages the rupturable disk. The inflator also includes means for clamping the clamping ring and the rupturable disk to the shoulder of the container means.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
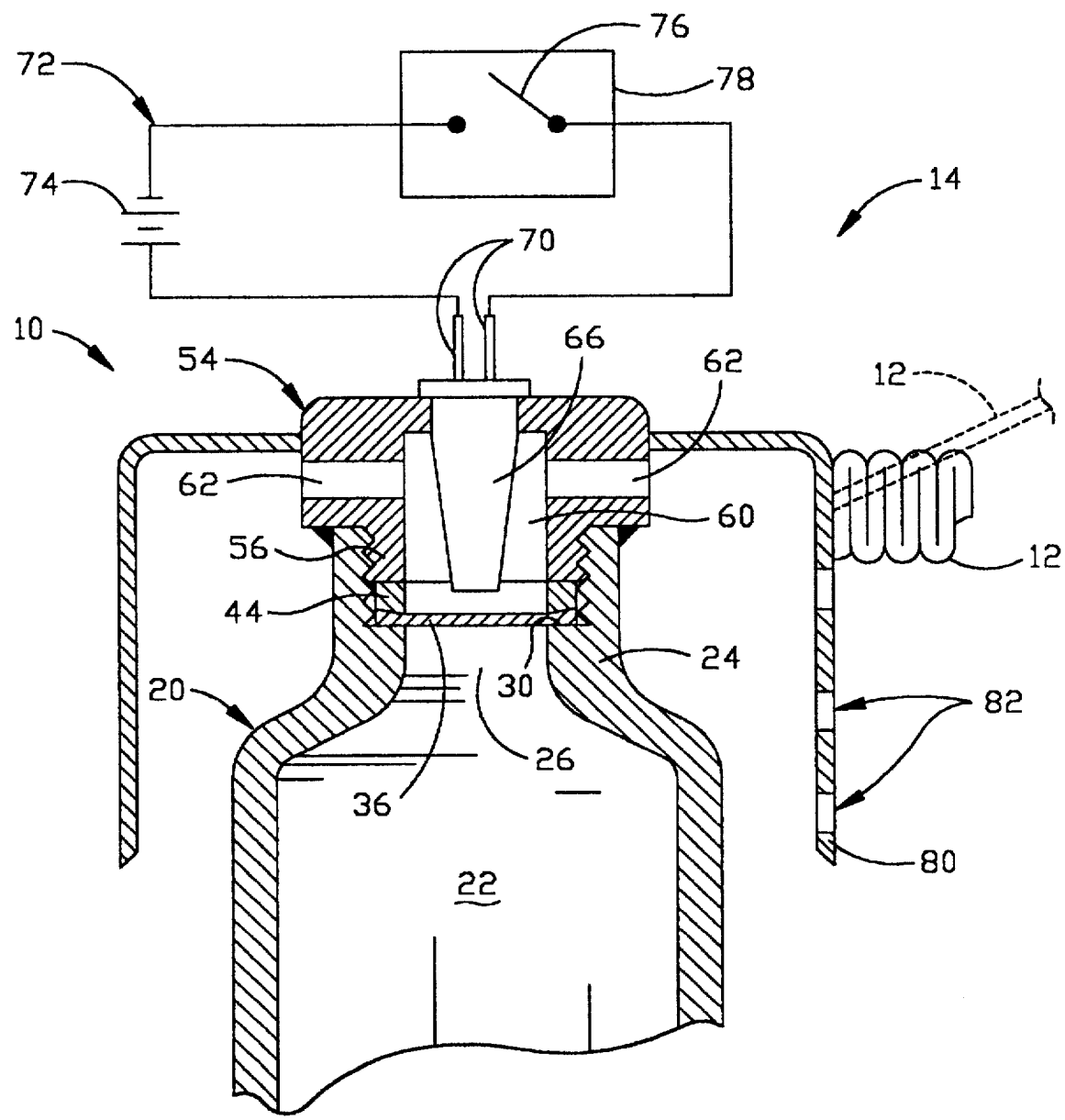
FIG. 1 is a schematic view of a vehicle occupant protection system including an inflator constructed in accordance with a first embodiment of the present invention.

A vehicle occupant protection system 10 (FIG. 1) constructed in accordance with the present invention includes an inflatable occupant protection device 12, commonly known as an air bag, and an inflator assembly 14. The inflator assembly 14 inflates the air bag 12 from a folded condition, as indicated partially in solid lines in FIG. 1, to an inflated condition, as indicated partially in dashed lines in FIG. 1, in response to a condition indicative of a vehicle collision having a severity above a predetermined threshold.

The inflator assembly 14 includes a container 20, preferably made of aluminum, which defines a chamber 22 containing an inflation fluid under pressure. The inflation fluid may be an inert gas, such as nitrogen or argon or a mixture of nitrogen and argon, or the inflation fluid may be a mixture of gases including an inert gas, a flammable fuel gas and an oxidizer gas. Alternatively, at least a portion of the inflation fluid may be produced by burning a pyrotechnic charge.

Figure 2:
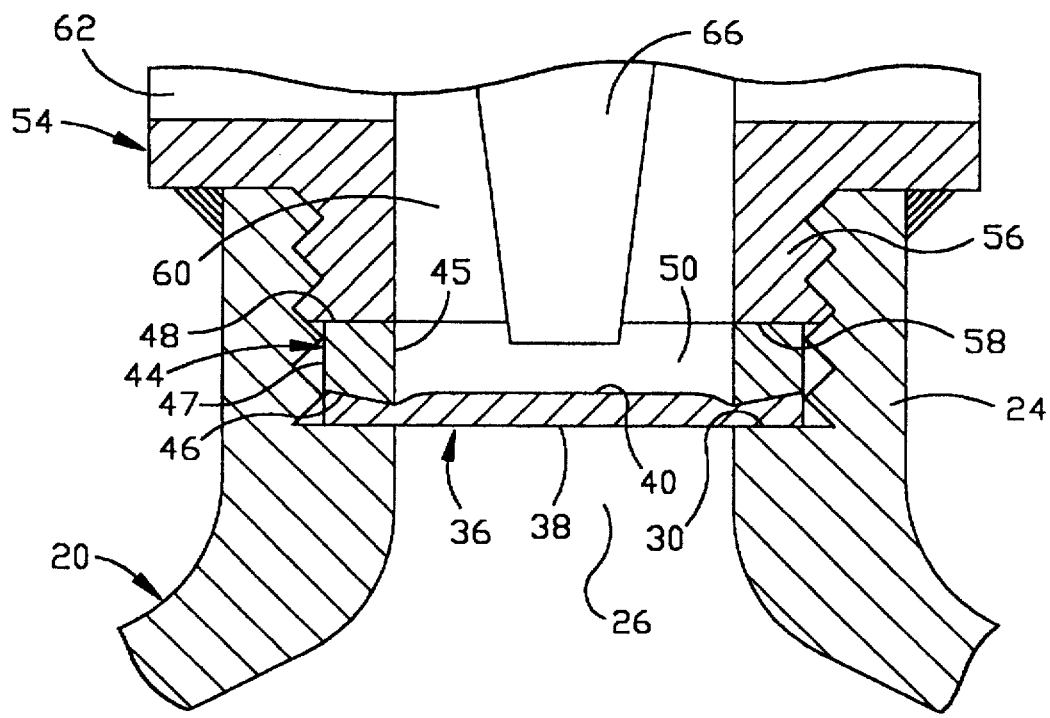
FIG. 2 is an enlarged sectional view of a portion of the inflator of FIG. 1.

The container 20 has an internally threaded neck portion 24 defining both an opening 26 and a shoulder 30 (FIG. 2). A rupturable disk 36, preferably made of steel, has a lower (as viewed in FIG. 2) surface 38 engaging the shoulder 30, and an upper surface 40 facing away from the shoulder. The burst disk 36 closes the opening 26 in the container 20. The burst disk 36 is rupturable along radially extending weakened portions 41 (FIG. 3) to permit inflation fluid to flow out of the container 20 through the opening 26. The weakened portions 41 are preferably score lines and may have any desired configuration. Although the burst disk 36 is shown as being generally flat, the burst disk may have a concave or domed central portion, as is well known in the art.

An annular clamping ring 44 engages the upper surface 40 of the burst disk 36. The clamping ring 44 has a configuration that is formed by rotating a trapezoid about an axis. The clamping ring 44 has a lower (as viewed in FIG. 2) annular surface 46 engaging the rupturable disk 36. The clamping ring 44 includes an inner cylindrical surface 45 and an outer cylindrical surface 47 extending parallel to the inner cylindrical surface 45. The lower surface 46 extends at an angle to the inner surface 45 and at an angle to the outer surface so that the clamping ring 44 is thicker adjacent the inner surface 45. The lower surface 46 does not extend parallel to the shoulder 30. Preferably, the lower surface is inclined at a small angle to the shoulder 30. An upper (as viewed in FIG. 2) annular surface 48 of the clamping ring 44 extends parallel to the shoulder 30. The clamping ring 44 has a circular central opening 50 defined by the inner surface 45.

A manifold 54 (FIG. 1) for directing inflation fluid from the container 20 has an externally threaded axially extending portion 56 screwed into the neck 24. The threaded portion 56 of the manifold 54 has a lower (as viewed in FIG. 2) annular surface 58 that engages the upper surface 48 of the clamping ring 44. The manifold 54 is welded to the neck 24 to prevent loosening of the manifold from the container 20.

The surface 58 of the manifold engages the clamping ring 44 to push the clamping ring against the rupturable disk 36 and the rupturable disk against the shoulder 30. The manifold 54 clamps the clamping ring 44 and the rupturable disk 36 against the shoulder 30. The force applied by the manifold against the clamping ring 44 causes the rupturable disk 36 to deform around the surface 46 of the clamping ring to form a seal between the clamping ring and the rupturable disk. Preferably, the edge defined by the intersection of the lower surface 46 and the inner surface 45 is rounded slightly to prevent the clamping ring 44 from cutting the disk 36. Accordingly, the inflation fluid in the container 20 does not leak from the container.

The manifold 54 (FIG. 1) has a central chamber 60 and a plurality of gas flow passages 62. The gas flow passages 62 extend radially outward from the central chamber 60 to the exterior of the manifold 54. An igniter 66 is located in the central chamber 60 in the manifold 54. The igniter 66 extends into the central opening 50 in the clamping ring 44, adjacent to the rupturable disk 36. The igniter 66 includes a pyrotechnic charge formed of a suitable pyrotechnic material, as is known in the art.

The igniter 66, which is supported by the manifold 54 in a known manner, includes a pair of lead wires 70 which are connected in an electrical circuit 72. The electrical circuit 72 includes a power source 74, which is preferably the vehicle battery and/or a capacitor, and a normally open switch 76, which is preferably a part of a vehicle collision sensor 78. The vehicle collision sensor 78 may be, for example, an accelerometer or a crash sensor.

When the vehicle experiences a collision having a severity above a predetermined threshold the switch 76 closes to complete the circuit 72 and actuate the igniter 66. The pyrotechnic charge in the igniter 66 is ignited and its products of combustion, including heat and a pressure wave, rupture the rupturable disk 36. The chamber 22 is opened and the inflation fluid in the chamber flows out of the container 20 through the opening 26. The products of combustion of the igniter 66 also enter the chamber 22 to heat and pressurize the inflation fluid in the chamber, either directly or through ignition of additional combustible material in the chamber. As the inflation fluid emerges from the gas flow passages 62 in the manifold 54, a diffuser 80 directs the inflation fluid outward through outlet openings 82 and into the air bag 12 to inflate the air bag. The air bag 12 is inflated from the folded condition to the inflated condition to help protect the vehicle occupant.

Figure 3:
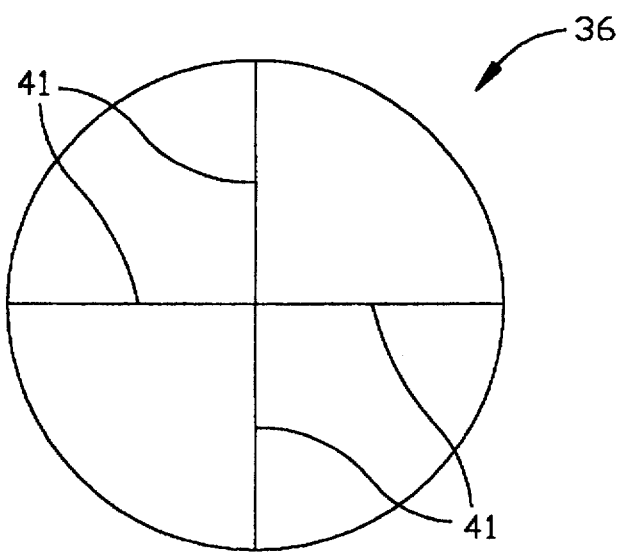
FIG. 3 is a plan view of a burst disk included in the inflator of FIG. 1.
Figure 4:
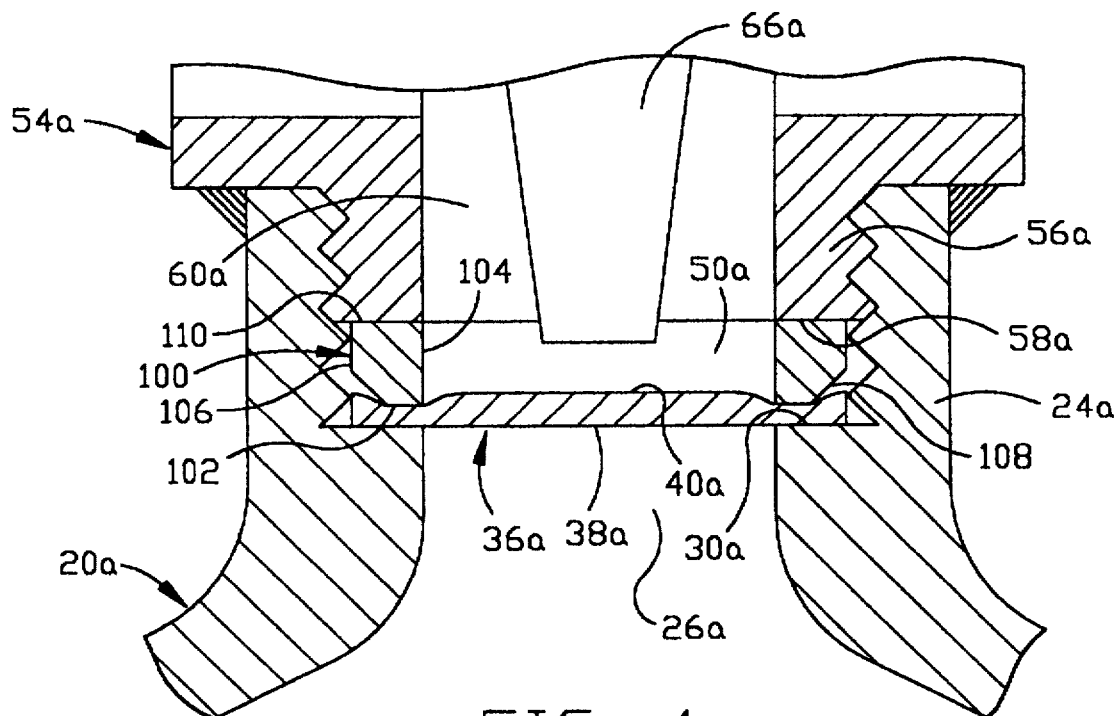
FIG. 4 is an enlarged sectional view of a portion of an inflator constructed in accordance with a second embodiment of the present invention.

In the embodiment of the invention illustrated in FIGS. 1–3, the clamping ring 44 has a shape formed by rotating a trapezoid about an axis. In the embodiment of the invention illustrated in FIG. 4, the clamping ring has a different shape than in the embodiment illustrated in FIGS. 1–3. Since the embodiment of the invention illustrated in FIG. 4 is generally similar to the embodiment of the invention illustrated in FIGS. 1–3, similar numerals will be utilized to designate similar components, the suffix letter "a" being associated with the numerals of FIG. 4 to avoid confusion.

An annular clamping ring 100 engages an upper surface 40a of a burst disk 36a which closes an opening 26a in a neck 24a of a container 20a. The clamping ring 100 has a lower (as viewed in FIG. 4) annular surface 102 engaging the rupturable disk 36a. The clamping ring 100 includes an inner cylindrical surface 104 and an outer cylindrical surface 106 extending parallel to the inner cylindrical surface 104. A surface 108 extends at an angle to the outer cylindrical surface 106 and the lower annular surface 102. The lower surface 102 extends perpendicular to the inner surface 104 and parallel to a shoulder 30a of the container 20a. An upper (as viewed in FIG. 4) annular surface 110 of the clamping ring 100 extends parallel to the shoulder 30a and the lower annular surface 102. The lower surface 102 extends radially from the inner surface 104 a distance smaller than the distance that the upper surface 110 extends from the inner surface 104. The clamping ring 100 has a circular central opening 50a defined by the inner surface 104.

A manifold 54a (FIG. 4) for directing inflation fluid from the container 20a has an externally threaded axially extending portion 56a screwed into the neck 24a of the container. The threaded portion 56a of the manifold 54a has a lower (as viewed in FIG. 4) annular surface 58a that engages the upper surface 110 of the clamping ring 100. The manifold 54a is welded to the neck 24a to prevent loosening of the manifold from the container 20a.

The surface 58a of the manifold 54a engages the clamping ring 100 to push the clamping ring against the rupturable disk 36a and a lower (as viewed in FIG. 4) surface 38a of the rupturable disk against the shoulder 30a. The manifold 54a clamps the clamping ring 100 and the rupturable disk 36a against the shoulder 30a. The force applied by the manifold 54a against the clamping ring 100 causes the rupturable disk 36a to deform around the surface 102 of the clamping ring to form a seal between the clamping ring and the rupturable disk. Preferably, the edges defined by the intersections of the lower surface 102 with the inner surface 104 and the surface 108 are rounded to prevent cutting of the disk 36a. Accordingly, inflation fluid in the container 20a does not leak from the container.

An igniter 66a is located in a central chamber 60a in the manifold 54a. The igniter 66a extends into the central opening 50a in the clamping ring 100 adjacent to the rupturable disk 36a. The igniter 66a includes a pyrotechnic charge formed of a suitable pyrotechnic material and ruptures the rupturable disk 36a when the vehicle experiences a collision having a severity above a predetermined threshold, as is known in the art.

Figure 5:
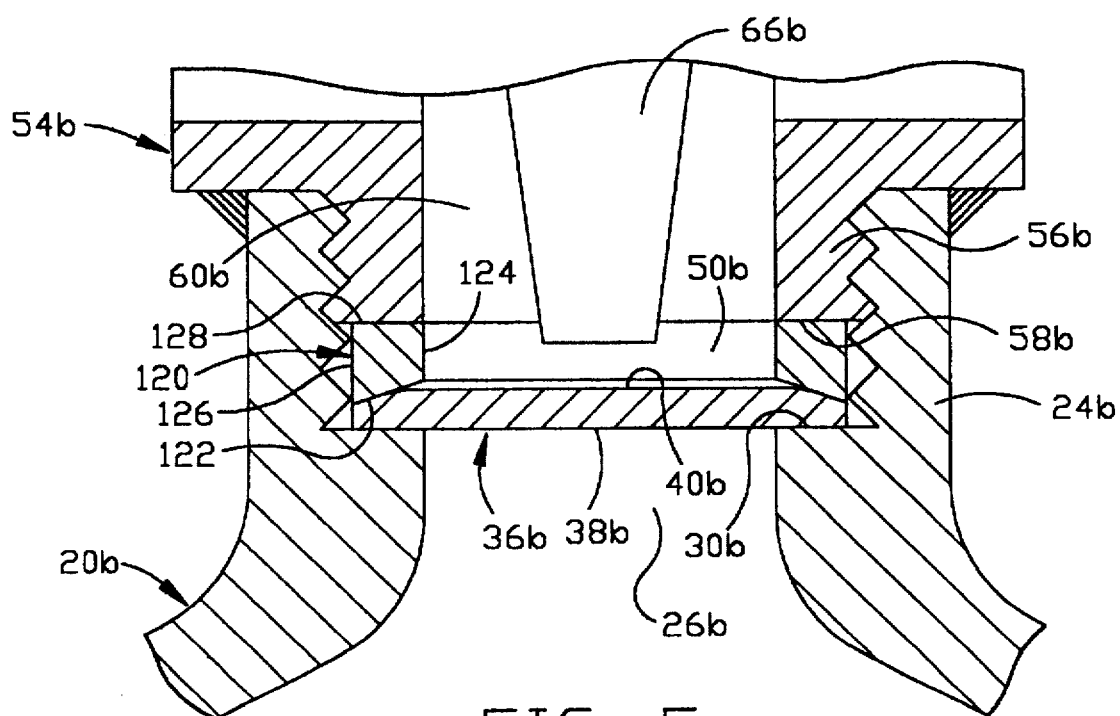
FIG. 5 is an enlarged sectional view of a portion of an inflator constructed in accordance with a third embodiment of the present invention.

In the embodiment of the invention illustrated in FIG. 5, the clamping ring has a third shape different from the shapes illustrated in FIGS. 1–4. Since the embodiment of the invention illustrated in FIG. 5 is generally similar to the embodiment of the invention illustrated in FIGS. 1–3, similar numerals will be utilized to designate similar components, the suffix letter "b" being associated with the numerals of FIG. 5 to avoid confusion.

An annular clamping ring 120 engages an upper surface 40b of a burst disk 36b which closes an opening 26b in a neck 24b of a container 20b. The clamping ring 120 has a lower (as viewed in FIG. 5) annular surface 122 engaging the rupturable disk 36b. The clamping ring 120 includes an inner cylindrical surface 124 and an outer cylindrical surface 126 extending parallel to the inner cylindrical surface 124. The lower surface 122 extends at an angle to the inner surface 124 and at an angle to the outer surface 126 so that the clamping ring 120 is thicker adjacent the outer cylindrical surface 126. The lower surface 122 does not extend parallel to the shoulder 30b and is preferably inclined at a small angle to the shoulder. An upper (as viewed in FIG. 5) annular surface 128 of the clamping ring 120 extends parallel to the shoulder 30b. The clamping ring 120 has a circular central opening 50b defined by the inner surface 124.

A manifold 54b for directing inflation fluid from the container 20b has an externally threaded axially extending portion 56b screwed into the neck 24b of the container 20b. The threaded portion 56b of the manifold 54b has a lower (as viewed in FIG. 5) annular surface 58b that engages the upper surface 128 of the clamping ring 120. The manifold 54b is welded to the neck 24b to prevent loosening of the manifold from the container 20b.

The surface 58b of the manifold 54b engages the clamping ring 120 to push the clamping ring against the rupturable disk 36b and a lower (as viewed in FIG. 5) surface 38b of the rupturable disk against the shoulder 30b. The manifold 54b clamps the clamping ring 120 and the rupturable disk 36b against the shoulder 30b. The force applied by the manifold against the clamping ring 120 causes the rupturable disk 36b to deform around the surface 122 of the clamping ring to form a seal between the clamping ring and the rupturable disk. Accordingly, the inflation fluid in the container 20b does not leak from the container.

An igniter 66b is located in a central chamber 60b of the manifold 54b. The igniter 66b extends into the central opening 50b in the clamping ring 120, adjacent to the rupturable disk 36b. The igniter 66b includes a pyrotechnic charge formed of a suitable pyrotechnic material and ruptures the rupturable disk 36b when the vehicle experiences a collision having a severity above a predetermined threshold, as is well known in the art.

Figure 6:
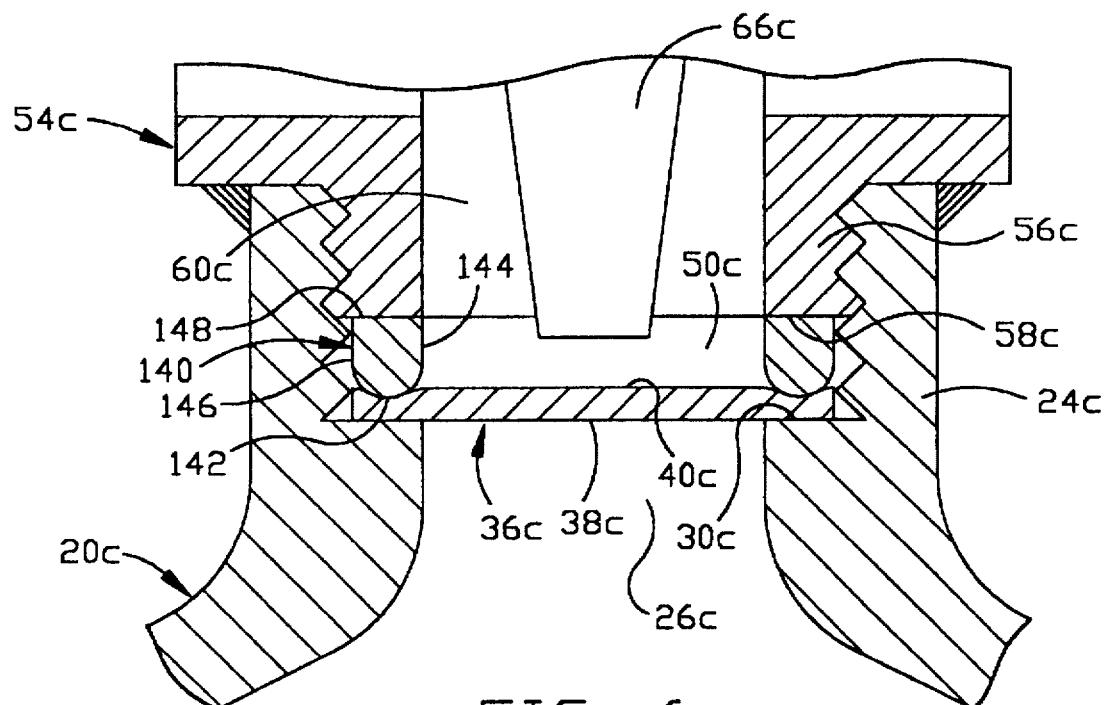
FIG. 6 is an enlarged sectional view of a portion of an inflator constructed in accordance with a fourth embodiment of the present invention.

In the embodiment of the invention illustrated in FIG. 6, the clamping ring has a fourth shape different from the shapes illustrated in FIGS. 1–5. Since the embodiment of the invention illustrated in FIG. 6 is generally similar to the embodiment of the invention illustrated in FIGS. 1–3, similar numerals will be utilized to designate similar components, the suffix letter "c" being associated with the numerals of FIG. 6 to avoid confusion.

An annular clamping ring 140 engages an upper surface 40c of a burst disk 36c which closes an opening 26c in a neck 24c of a container 20c. The clamping ring 140 has a lower (as viewed in FIG. 6) arcuate annular surface 142 engaging the rupturable disk 36c. The clamping ring 140 includes an inner cylindrical surface 144 and an outer cylindrical surface 146 extending parallel to the inner cylindrical surface 144. The arcuate surface 142 extends between the inner surface 144 and the outer surface 146. An upper (as viewed in FIG. 6) annular surface 148 of the clamping ring 140 extends parallel to a shoulder 30c of the container 20c. The clamping ring 140 has a circular central opening 50c defined by the inner surface 144.

A manifold 54c for directing inflation fluid from the container 20c has an externally threaded axially extending portion 56c screwed into the neck 24c of the container 20c. The threaded portion 56c of the manifold 54c has a lower (as viewed in FIG. 6) annular surface 58c that engages the upper surface 148 of the clamping ring 140. The manifold 54c is welded to the neck 24c to prevent loosening of the manifold from the container 20c.

The surface 58c of the manifold engages the clamping ring 140 to push the clamping ring against the rupturable disk 36c and a lower (as viewed in FIG. 6) surface 38c of the rupturable disk against the shoulder 30c. The manifold 54c clamps the clamping ring 140 and the rupturable disk 36c against the shoulder 30c. The force applied by the manifold against the clamping ring 140 causes the rupturable disk 36c to deform around the surface 142 of the clamping ring to form a seal between the clamping ring and the rupturable disk. Accordingly, the inflation fluid in the container 20c does not leak from the container.

An igniter 66c is located in a central chamber 60c in the manifold 54c. The igniter 66c extends into the central opening 50c in the clamping ring 140, adjacent the rupturable disk 36c. The igniter 66c includes a pyrotechnic charge formed of a suitable pyrotechnic material and ruptures the rupturable disk 36c when the vehicle experiences a collision having a severity above a predetermined threshold, as is known in the art.

Figure 7:
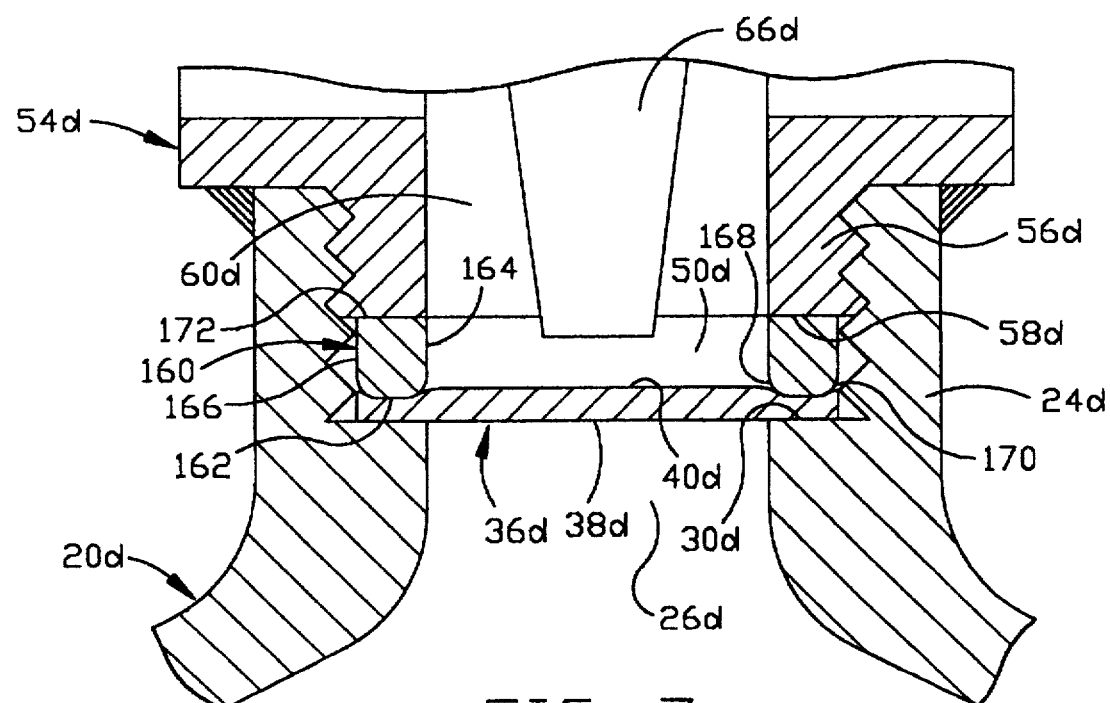
FIG. 7 is an enlarged sectional view of a portion of an inflator constructed in accordance with a fifth embodiment of the present invention.

In the embodiment of the invention illustrated in FIG. 7, the clamping ring has yet another shape different from the shapes of the clamping rings illustrated in FIGS. 1–6. Since the embodiment of the invention illustrated in FIG. 7 is generally similar to the embodiment of the invention illustrated in FIGS. 1–3, similar numerals will be utilized to designate similar components, the suffix letter "d" being associated with the numerals of FIG. 7 to avoid confusion.

An annular clamping ring 160 engages an upper surface 40d of a rupturable disk 36d which closes an opening 26d in a neck 24d of a container 20d. The clamping ring 160 has a flat lower (as viewed in FIG. 7) annular surface 162 engaging the rupturable disk 36d. The clamping ring 160 includes an inner cylindrical surface 164 and an outer cylindrical surface 166 extending parallel to the inner cylindrical surface 164. An arcuate surface 168 extends between the flat lower surface 162 and the inner cylindrical surface 164. An arcuate surface 170 extends between the flat lower surface 162 and the outer cylindrical surface 166. The lower surface 162 extends parallel to a shoulder 30d of the container 20d. An upper (as viewed in FIG. 7) annular surface 172 of the clamping ring 160 extends parallel to the shoulder 30d and the lower surface 162. The clamping ring 160 has a circular central opening 50d defined by the inner surface 164.

A manifold 54d for directing inflation fluid from the container 20d has an externally threaded axially extending portion 56d screwed into the neck 24d of the container 20d. The threaded portion 56d of the manifold 54d has a lower (as viewed in FIG. 7) annular surface 58d that engages the upper surface 172 of the clamping ring 160. The manifold 54d is welded to the neck 24d to prevent loosening of the manifold from the container 20d.

The surface 58d of the manifold 54d engages the clamping ring 160 to push the clamping ring against the rupturable disk 36d and a lower (as viewed in FIG. 7) surface 38d of the rupturable disk against the shoulder 30d. The manifold 54d clamps the clamping ring 160 and the rupturable disk 36d against the shoulder 30d. The force applied by the manifold 54d against the clamping ring 160 causes the rupturable disk 36d to deform around the surface 162 of the clamping ring to form a seal between the clamping ring and the rupturable disk. Accordingly, the inflation fluid in the container 20d does not leak from the container.

An igniter 66d is located in a central chamber 60d in the manifold 54d. The igniter 66d extends into the central opening 50d in the clamping ring 160, adjacent to the rupturable disk 36d. The igniter 66d includes a pyrotechnic charge formed of a suitable pyrotechnic material and ruptures the rupturable disk 36d when the vehicle experiences a collision having a severity above a predetermined threshold, as is well known in the art.

From the above description of the invention, those skilled in the art will perceive improvements, changes and modifications in the invention. For example, although the inflatable occupant restraint is shown as an air bag 12, it is contemplated that the inflatable occupant restraint may be an inflatable seat belt. Such improvements, changes and modifications within the skill of the art are intended to be covered by the appended claims.

Having described the invention, we claim the following:

1. An apparatus for inflating an inflatable vehicle occupant protection device, said apparatus comprising:

container means for defining a chamber containing a source of inflation fluid, said container means including surface means for defining an opening through which the inflation fluid flows outward from said chamber, said surface means also defining a shoulder in said container means;

a rupturable disk for closing said opening in said chamber, said rupturable disk engaging said shoulder in said container means;

an annular clamping ring engaging said rupturable disk, said clamping ring including localized means for deforming said rupturable disk to form a seal between said clamping ring and said rupturable disk; and means for clamping said clamping ring and said rupturable disk to said shoulder of said container means.

2. An apparatus as set forth in claim 1 wherein said clamping ring has an annular surface engaging said rupturable disk.

3. An apparatus as set forth in claim 1 wherein said clamping ring has first and second annular surfaces, said first annular surface extending generally parallel to said shoulder in said container means and said second annular surface engaging said rupturable disk.

4. An apparatus as set forth in claim 3 wherein said clamping ring includes radially inner and outer cylindrical surfaces extending generally parallel to each other, said second annular surface extending at an angle to said inner cylindrical surface.

5. An apparatus as set forth in claim 4 wherein said clamping ring is thicker adjacent said inner cylindrical surface than adjacent said outer cylindrical surface.

6. An apparatus as set forth in claim 4 wherein said clamping ring is thicker adjacent said outer cylindrical surface than adjacent said inner cylindrical surface.

7. An apparatus as set forth in claim 3 wherein said second annular surface extends generally parallel to said first annular surface and said shoulder.

8. An apparatus as set forth in claim 7 wherein said second annular surface extends radially a first distance and said first annular surface extends radially a second distance greater than the first distance.

9. An apparatus as set forth in claim 7 wherein said clamping ring includes radially inner and outer cylindrical surfaces extending generally parallel to each other, and arcuate surfaces extending from said second annular surface to said inner and outer cylindrical surfaces.

10. An apparatus as set forth in claim 3 wherein said second annular surface is arcuate.

11. An apparatus as set forth in claim 1 wherein said clamping means comprises means for directing gas from said opening toward the inflatable device.

12. An apparatus as set forth in claim 11 wherein said directing means includes an axially extending portion which extends into said opening in said container means and which engages said clamping ring.

13. An apparatus as set forth in claim 12 wherein said axially extending portion of said directing means threadably engages said surface means defining said opening.

14. An apparatus as set forth in claim 11 wherein said directing means supports means for rupturing said rupturable disk.

15. An apparatus as set forth in claim 14 wherein said means for rupturing said rupturable disk comprises an igniter actuatable in response to a condition indicative of a vehicle collision having a severity above a predetermined threshold.

16. An apparatus as set forth in claim 1 wherein said rupturable disk includes a plurality of weakened portions along which said rupturable disk is rupturable.

17. A vehicle occupant protection system comprising:

an inflatable occupant protection device;

container means for defining a chamber containing a source of inflation fluid, said container means including surface means for defining an opening through which the inflation fluid flows outward from said chamber, said surface means also defining a shoulder in said container means;

a rupturable disk for closing said opening in said chamber, said rupturable disk engaging said shoulder in said container means;

an annular clamping ring engaging said rupturable disk, said clamping ring including first and second annular surfaces, said first annular surface extending generally parallel to said shoulder in said container means and said second annular surface engaging said rupturable disk and deforming said rupturable disk to form a seal between said clamping ring and said rupturable disk; and means for directing inflation fluid from said container means toward said inflatable device, said directing means including means for clamping said clamping ring and said rupturable disk to said shoulder of said container means.

18. A vehicle occupant protection system as set forth in claim 17 wherein said clamping ring includes radially inner and outer cylindrical surfaces, said second annular surface extending at an angle to said inner surface.

19. A vehicle occupant protection system as set forth in claim 17 wherein said second annular surface extends generally parallel to said first annular surface and said shoulder.

20. A vehicle occupant protection system as set forth in claim 17 wherein said second annular surface is arcuate.

21. A vehicle occupant protection system as set forth in claim 17 wherein said directing means includes an axially extending portion extending into said opening in said container means and engaging said clamping ring.

22. A vehicle occupant protection system as set forth in claim 21 wherein said axially extending portion of said directing means threadably engages said surface means defining said opening.

23. A vehicle occupant protection system as set forth in claim 22 further including means for rupturing said rupturable disk comprising an igniter actuatable in response to a condition indicative of a vehicle collision having a severity above a predetermined threshold, said igniter being supported by said directing means.

24. An apparatus for inflating an inflatable vehicle occupant protection device, said apparatus comprising:

container means for defining a chamber containing a source of inflation fluid, said container means including surface means for defining an opening through which the inflation fluid flows outward from said chamber, said surface means including a first surface for defining a shoulder in said container means;

a rupturable disk for closing said opening in said chamber, said rupturable disk engaging said surface defining said shoulder in said container means;

an annular clamping ring engaging said rupturable disk, said clamping ring including a second surface extending nonparallel to said first surface for defining said shoulder and engaging said rupturable disk; and means for clamping said clamping ring and said rupturable disk to said shoulder of said container means.

25. An apparatus as set forth in claim 24 wherein said second surface of said clamping ring includes localized means for deforming said rupturable disk to form a seal between said clamping ring and said rupturable disk.

* * * * *